(12) United States Patent
Johnson et al.

(10) Patent No.: US 8,478,800 B1
(45) Date of Patent: Jul. 2, 2013

(54) LOG STREAMING FACILITIES FOR COMPUTING APPLICATIONS

(75) Inventors: Don Johnson, Seattle, WA (US); Bradley E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 161 days.

(21) Appl. No.: 12/891,684

(22) Filed: Sep. 27, 2010

(51) Int. Cl.
*G06F 17/30* (2006.01)

(52) U.S. Cl.
USPC .......................................... 707/827

(58) Field of Classification Search
USPC .......................................... 707/827
See application file for complete search history.

(56) References Cited

U.S. PATENT DOCUMENTS

| | | | |
|---|---|---|---|
| 6,078,982 A * | 6/2000 | Du et al. | 710/200 |
| 2002/0042821 A1* | 4/2002 | Muret et al. | 709/223 |
| 2007/0283194 A1* | 12/2007 | Villella et al. | 714/57 |
| 2008/0034415 A1* | 2/2008 | Chacko et al. | 726/14 |
| 2010/0042719 A1* | 2/2010 | Kinoshita | 709/225 |
| 2010/0115620 A1* | 5/2010 | Alme | 726/24 |
| 2010/0205370 A1* | 8/2010 | Ikawa et al. | 711/114 |

OTHER PUBLICATIONS

Besaw, L., "Berkely UNIX System Calls and Interprocess Communication," [online]. Madison (WI): University of Wisconsin Computer Sciences Department, 1987 [retrieved on Oct. 18, 2012]. Retrieved from the Internet: <URL: pages.cs.wisc.edu/~lhl/cs740/assignments/references/stock.ps>.
POSIX Conformance Document Datasheet [online]. Hewlett Packard, 1994 [retrieved on Oct. 18, 2012]. Retrieved from the Internet: <URL: ftp://210.45.114.81/cs/_=Unix=_/HPUX/Software/POSIX%D2%BB%D6%C2%D0%D4%CE%C4%B5%B5.pdf>.

* cited by examiner

*Primary Examiner* — Charles Kim
*Assistant Examiner* — Randall Burns
(74) *Attorney, Agent, or Firm* — Kilpatrick Townsend & Stockton LLP

(57) ABSTRACT

To facilitate log streaming in a computing cloud, application service providers may dynamically provision one or more named log streams. A file-oriented interface to log streams may be made available to a plurality of virtual computer system instances used to provide the application services. Application service providers may further dynamically provision one or more sets of log stream processing agents arranged in one or more log stream processing graphs. Particular log streams may be assigned to particular log stream processing graphs for real-time processing. Processed log streams and/or associated data may be stored for later inspection. Such provisioning and/or configuration may be performed with a unified Web-based interface.

27 Claims, 11 Drawing Sheets

LOG STREAMING FACILITIES FOR COMPUTING APPLICATIONS

BACKGROUND

In modern computing applications, it is common for the data that is presented to an ordinary application user to be just a fraction of the data that is generated and/or used internally by the application. One reason for this is simply to avoid overwhelming the user with information. The data fraction presented to the user is typically carefully designed and/or chosen to help achieve the user's goals. However, it is not uncommon for some application users, such as application administrators, to desire and/or to require access to a greater fraction of the internal application data, for example, for auditing, resource tuning and/or anomalous behavior investigation ("debugging") purposes. Furthermore, the needs and/or goals of users can change, and archives of historical data have many times proven valuable.

Accordingly, it is not uncommon for applications to record selected portions of the internal application data in data logs for later processing and/or inspection. However, conventional data logging mechanisms have several shortcomings, particularly in a virtualized-remotely accessed computing context, such as cloud computing. In cloud computing, a collection of physical servers, perhaps geographically distributed, may maintain a (potentially larger) collection of virtual computer system "instances." Applications may obtain various benefits by executing in the virtual computer system instances. However, such virtual system instances typically have relatively limited data storage suited to data logs. Some conventional cloud computing platforms include an independent, reliable bulk data storage service. However, such services typically have interfaces that are heavyweight, inefficient and/or otherwise unsuited to data logging, and particularly high rate data logging.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
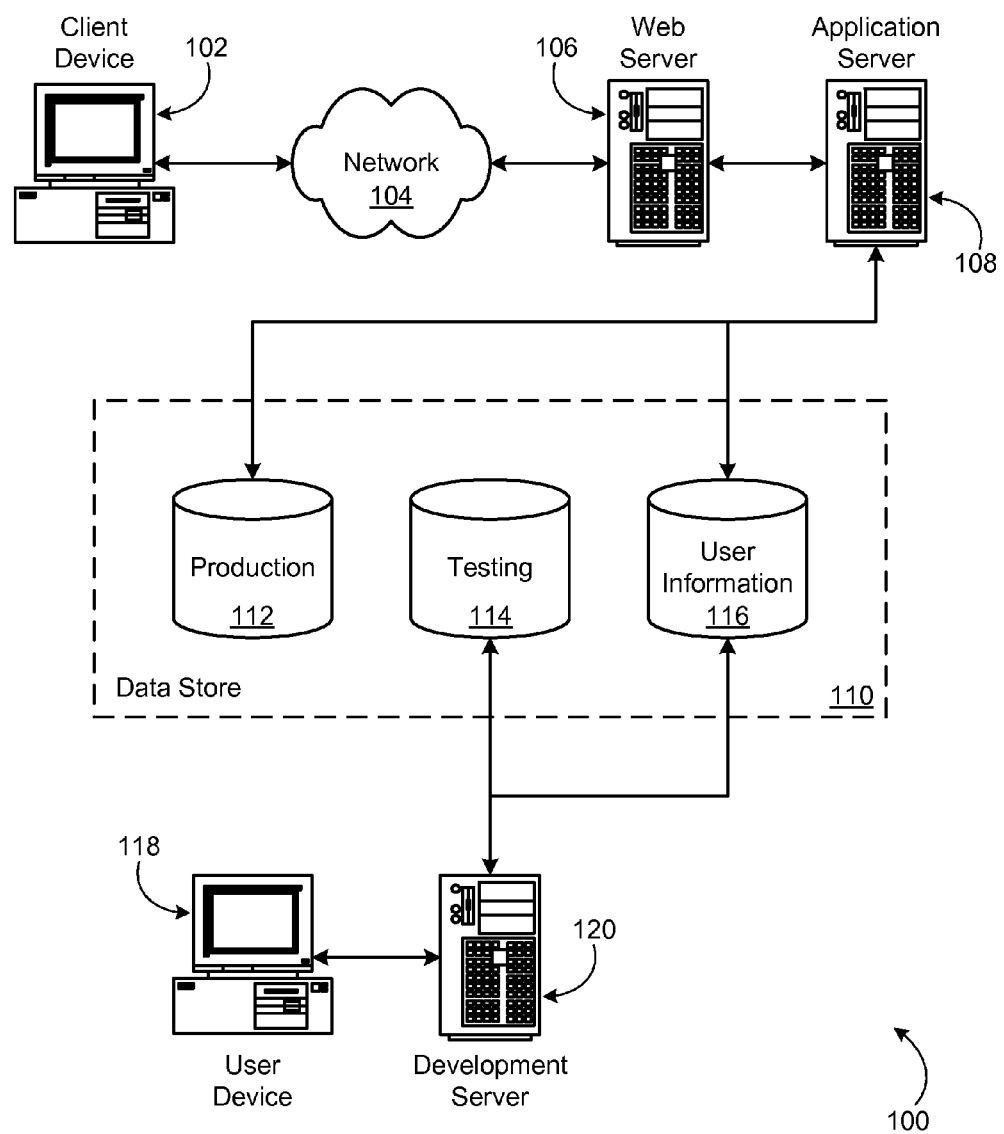
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, log streaming facilities are provided for applications executing within a distributed program execution service. In a distributed program execution service, application service providers may provision virtual computer system instances ("virtual system instances") to execute applications that provide services to application users. The distributed program execution service can be, for example, a cloud computing environment. Application service providers may be considered customers of the distributed program execution service, and application users may be considered customers of the application service providers.

To facilitate logging, application service providers may provision one or more named log streams in the distributed program execution service. A file-oriented interface to log streams may be made available to the virtual system instances. For example, log streams may be mounted by virtual system instances as a type of file system, e.g., as a log file system ("logFS"). Application service providers may further provision one or more sets of log stream processing agents arranged in one or more log stream processing graphs (i.e., directed graphs in the sense of graph theory having log stream processing agents as nodes). Particular log streams may be assigned to particular log stream processing graphs for real-time processing. Processed log streams and/or associated data may be stored for later inspection.

The virtual system instances, the log streams, the log stream processing agents and/or the log stream processing graph may be provisioned and/or dynamically reconfigured with a Web-based provisioning interface such as a Web-based graphical user interface (GUI). The file-oriented interface for accessing the log streams may be an application programming interface (API) including interface elements corresponding to file operations in accordance with a portable operating system interface (POSIX) standard, for example, file operations such as fopen, fwrite and fc lose. The file-oriented interface may operate in a substantially write-only mode. In at least one embodiment, the substantially write-only mode of operation enables efficient implementation and high performance logging.

Log streams may be streamed from agent to agent in accordance with an order indicated by the arrows of an associated log stream processing graph. The log stream processing agents may include parsing agents for parsing field values from records in the log stream, metric agents for determining metrics based on received log streams, alarm agents for generating alarms based on received log streams, archiving agents for archiving received log records, as well as agents for transforming log streams such as filtering agents that pass or drop log records matching a log stream filter (e.g., corresponding to a regular expression), sampling agents that pass a representative sample of received log records (e.g., according to type), and aggregation agents that aggregate similar log records (e.g., with respect to specified time periods). A custom log stream processing graph need not be specified for each log stream. For example, log streams may initially be assigned to a default log stream processing graph having an archiving agent.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
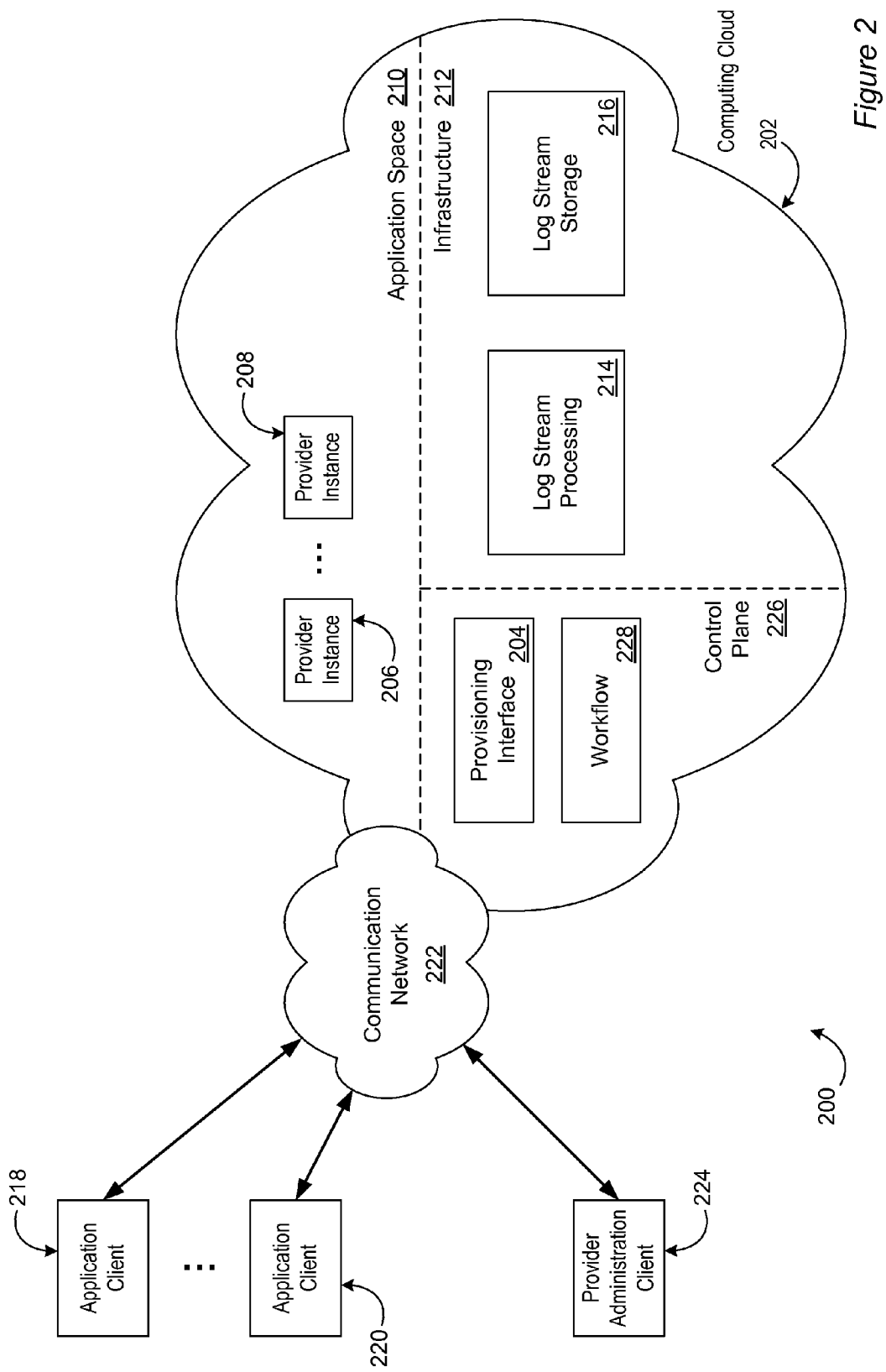
FIG. 2 is a schematic diagram depicting aspects of an example distributed program execution service architecture in accordance with at least one embodiment.

In at least one embodiment, one or more aspects of the environment 100 may incorporate and/or be incorporated into a distributed program execution service architecture, such as a cloud computing environment. FIG. 2 depicts aspects of an example cloud computing environment 200 in accordance with at least one embodiment. The example cloud computing environment 200 includes a distributed program execution service, depicted as a computing cloud 202. The computing cloud 202 may include a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as the Web server 106 and the application server 108 described above with reference to FIG. 1, as well as one or more data stores such as the data store 110 of FIG. 1. Such computing resources are not shown explicitly in FIG. 2 because it is an aspect of the computing cloud 202 to emphasize independence from the physical computers and networking equipment that implement the computing cloud 202.

The computing cloud 202 may utilize its computing resources to execute one or more programs, program modules, program components and/or programmatic objects ("program components") including and/or compiled from instructions and/or code specified with any suitable machine and/or programming language. The program components may be distributed throughout the computing cloud 202. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. Computing resource allocations may be elastic. From a perspective of an application service provider, the computing cloud 202 may supply computing resources elastically and/or on-demand, for example, associated with a per resource unit commodity-style pricing plan.

A application service provider may use a provisioning interface 204 of the computing cloud 202 to provision one or more virtual computer system instances such as provider instances 206 and 208. The ellipsis between the provider instances 206 and 208 indicates that the computing cloud 202 may support any suitable number of provider instances although, for clarity, only two are shown. For example, the computing cloud 202 may include thousands, millions, or more of provider instances. The application service provider need not be concerned as to the nature and/or location of the physical computing resources allocated by the computing cloud 202 to maintain the provider instances 206, 208. Indeed, the computing resource allocation may be varied by the computing cloud 202 in a manner transparent to the application service provider. The application service provider may then configure the provisioned virtual computer system instances 206, 208 to provide application services in a manner similar to the configuration of conventional computer systems. For example, the application service provider may configure operating system components of the virtual computer system instances 206, 208, as well as cause the virtual computer system instances 206, 208 to execute application programs, modules, components and/or objects including and/or compiled from instructions and/or code specified with any suitable machine and/or programming language.

The computing cloud 202 may have an application space portion 210 and an infrastructure portion 212. The application space 210 may include computing resources allocated to maintaining the provider instances 206, 208 and, thereby, the application services. The application space portion 210 of the computing cloud 202 is also called the application provider portion 210. The infrastructure portion 212 may include a log stream processing component 214 configured to process log streams and a log stream storage component 216 configured to store processed log streams and associated data such as metrics derived from log streams. The computing cloud 202 may further include a control plane 226. The control plane 226 and/or the infrastructure 212 may include computing resources allocated to services such as resource provisioning, monitoring and billing.

The control plane 226 may control, and/or be utilized to control, various aspects of the application space portion 210 and the infrastructure portion 212 of the computing cloud 202. For example, the control plane 226 may include the provisioning interface 204 utilized by application service providers and computing cloud 202 administrators to provision provider instances 206, 208, log streams, facilities provided by the log stream processing component 214 and/or facilities provided by the log stream storage component 216. The various aspects and/or facilities of the application space portion 210 and the infrastructure portion 212 may be associated with specific interfaces such as application programming interfaces (APIs). However, the complexity and variety of the specific interfaces may be such as to require special training to utilize effectively. In at least one embodiment, the control plane 226 further includes a workflow component 228 configured at least to interact with and/or guide interaction with the specific interfaces of the various aspects and/or facilities of the application space portion 210 and/or the infrastructure portion 212 in accordance with one or more workflows.

In at least one embodiment, instead of interacting directly with the specific interfaces, a user and/or administrator may interact with the provisioning interface 204 and, in response, the provisioning interface 204 may create, and/or cause the workflow component 228 to create, one or more provisioning workflows that are then maintained by the workflow component 228. Workflows, such as provisioning workflows, may include one or more sequences of tasks to be executed to perform a job, such as provisioning. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the provisioning interface 204.

The workflow component 228 may modify, further specify and/or further configure established workflows. For example, the workflow component 228 may select particular computing resources of the computing cloud 202 to execute and/or be assigned to particular tasks. Such selection may be based at least in part on the computing resource needs of the particular task as assessed by the workflow component 228. As another example, the workflow component 228 may add additional and/or duplicate tasks to an established workflow and/or reconfigure information flow between tasks in the established workflow. Such modification of established workflows may be based at least in part on an execution efficiency analysis by the workflow component 228. For example, some tasks may be efficiently performed in parallel, while other tasks depend on the successful completion of previous tasks.

One or more application clients 218, 220 may interact with the provider instances 206, 208 in the computing cloud 202 through a communication network 222. For example, the application clients 218, 220 may be computer programs, modules, components and/or objects incorporating and/or incorporated into computing devices such as the client device 102 described above with reference to FIG. 1, the communication network 222 may incorporate and/or be incorporated into the network 104 of FIG. 1. The ellipsis between the application clients 218 and 220 indicates that the cloud computing environment 200 may include any suitable number of application clients although, for clarity, only two are shown. The communication network 222 is depicted in FIG. 2 as overlapping both the application space 210 and infrastructure 212 portions of the computing cloud 202 to indicate that the computing cloud 202, itself incorporating a rich data network fabric, may interconnect with the communication network 222 at any suitable number of, possibly geographically disparate, interconnection points.

For clarity, FIG. 2 depicts a separate provider administration client 224. The provider administration client 224 may be utilized by the application service provider to interact with the provisioning interface 204 of the computing cloud 202 in order to provision, de-provision, configure, and/or reconfigure (collectively, "provision") cloud computing resources. For example, the provisioning interface 204 may include one or more suitable programming interfaces such as one or more application programming interfaces (APIs). The provision interface 204 may also include a Web-based graphical user interface (GUI), and the provider administration client 224 may include a Web browser that interacts with the Web-based GUI. By interacting with the provisioning interface 204, the application service provider may provision provider instances 206, 208, log streams, log stream processing agents, log stream processing graphs, and/or log stream storage, as well as relationships, assignments, allocations and/or associations between provisioned entities. Such entities may respond dynamically and/or in real-time to provisioning changes. Computing cloud resources may be dynamically reallocated in response to provisioning changes, for example, to optimize log stream processing efficiency. The provisioning interface 204 may provision the log steams, the log stream processing agents and/or the log stream processing graphs with the log stream processing component 214, and may provision the log stream storage with the log stream storage component 216. For example, the log stream storage component 216 may incorporate and/or be incorporated by one or more data stores such as the data store 110 of FIG. 1.

During execution, applications at the provider instances 206, 208 may write log records to one or more provisioned log streams. For example, the computing cloud 202 may include hundreds, thousands, millions, or more of provisioned log streams. In at least one embodiment, provisioned log streams are associated with one or more log stream processing graphs of log stream processing agents maintained by the log stream processing component 214 of the infrastructure 212. For example, the computing cloud 202 may include hundreds, thousands, millions, or more of provisioned log stream processing graphs. Log records written to provisioned log streams may be streamed through the computing cloud 202 to log stream processing agents of associated log stream processing graphs (e.g., to log stream processing agents corresponding to root nodes of the log stream processing graphs). The log streams may be processed in accordance with the log stream processing graphs, for example, processed by log stream processing agents in an order indicated by the arrows of the log stream processing graphs. Some of the log stream processing agents may be log stream archive agents configured at least to store received log stream data in suitable storage for subsequent inspection, for example, log stream data may be stored with the log stream storage component 216 for inspection by the provider administration client 224. Such inspection may include inspection, in graphical form, of time series of metrics based at least in part on the log stream data.

Figure 3:
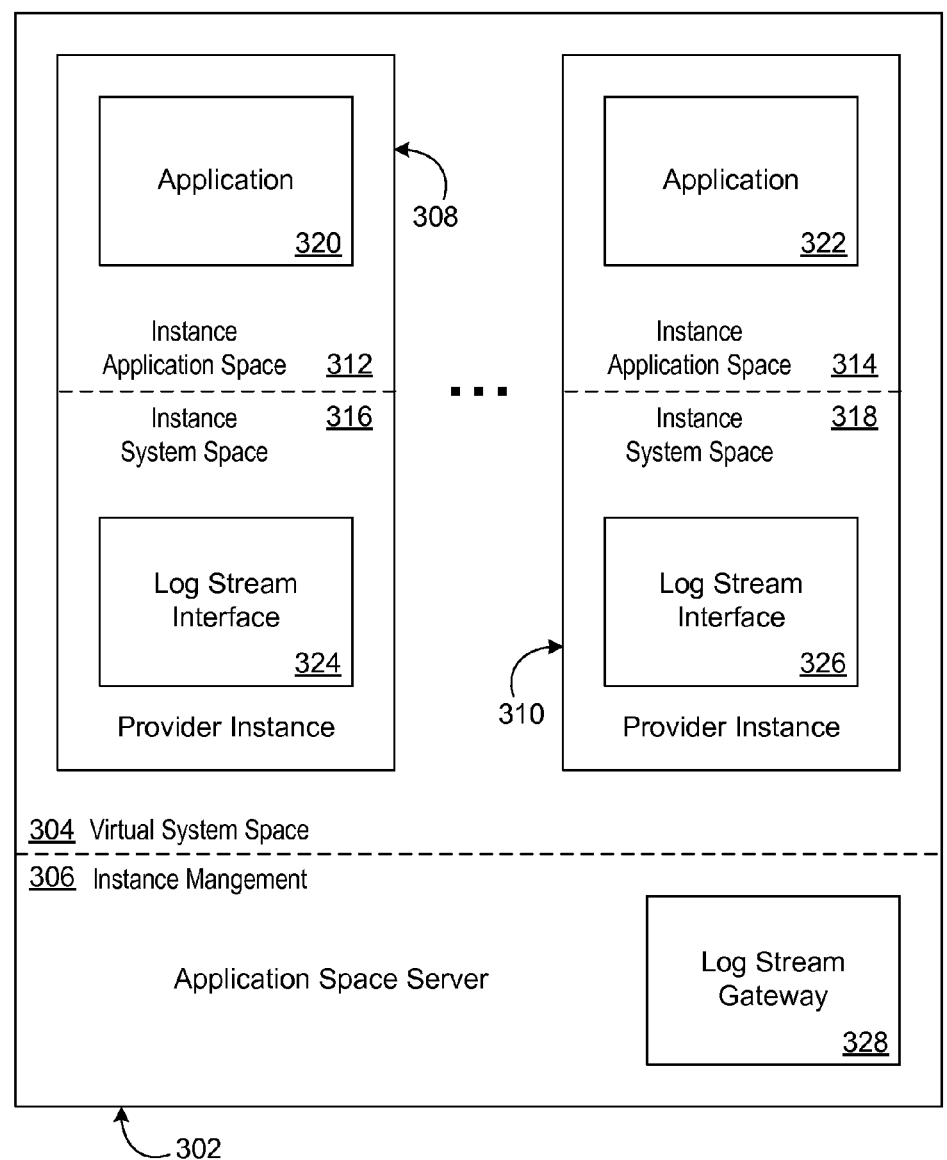
FIG. 3 is a schematic diagram depicting aspects of an example application space server in accordance with at least one embodiment.

The application space 210 may include a set of physical servers configured at least to maintain the provider instances 206, 208. FIG. 3 depicts aspects of an example application space server 302 in accordance with at least one embodiment. The server 302 has a set of computing resources such as one or more processors, volatile storage such as random access memory (RAM) and non-volatile storage such as flash memory and/or one or more hard drives. The computing resources of the server 302 are allocated to supporting at least a virtual system space portion 304 and an instance management portion 306. The computing resources allocated to the virtual system space 304 support one or more virtual computer system instances such as provider instances 308 and 310. The provider instances 308 and 310 are examples of the provider instances 206 and 208 of FIG. 2. The ellipsis between the provider instances 308 and 310 indicates that the virtual system space may support any suitable number of provider instances although, for clarity, only two are shown. The computing resources of the instance management portion 306 of the server 302 support instance management services including provider instance 308, 310 creation, configuration and/or deletion. Different provider instances 308, 310 may be associated with different application service providers.

In at least one embodiment, the provider instances 308, 310 are virtual computer system instances. Accordingly, the virtual computing resources of the provider instances 308, 310 may be allocated to instance application spaces 312, 314 and instance system spaces 316, 318. The virtual computing resources of the instance application spaces 312, 314 may support applications 320, 322 executing with application space (sometimes called user space) privileges. The instance system spaces 316, 318 may include log stream interfaces 324, 326. The applications 320 and 322 may write to provisioned log streams with the log stream interfaces 324 and 326, respectively. The log stream interfaces 324, 326 may be located in the instance system space 316, 318 of the provider instances 308, 310 so as to execute with system space privileges, for example, the log stream interfaces 324, 326 may incorporate a virtual log stream device driver (not shown in FIG. 3).

In at least one embodiment, the log stream interface 324 is a file-oriented interface. For example, the provider instance 308 may maintain a directory structure having one or more mount points, and the log stream interface 324 may be mounted as a file system at a suitable mount point. That is, the log stream interface 324 may include a log file system device driver configured at least to maintain a file system style interface to one or more provisioned log streams. As an example, suppose the application service provider utilized the provisioning interface 204 (FIG. 2) to provision three log streams named "myapp_audit_trail", "myapp_metrics" and "myapp_error". An administrator of the provider instance 308 may utilize a conventional file system "mount" command to mount the three log streams to a "/dev/logFS" mount point. The three log streams are then subject to manipulation with conventional file operations as implemented by the log stream interface 324 in accordance with at least one embodiment. For example, the three log streams may be accessed (e.g., a file handle obtained) with a file open operation at file paths "/dev/logFS/myapp_audit_trail", "/dev/logFS/myapp_metrics", and "/dev/logFS/myapp_error", respectively. Log records may be written to the open log streams with a file write operation, and file resources (e.g., associated with the file handle) may be freed for reuse, and any log stream write buffers flushed, with a file close operation. Log records written with the file-oriented interface may be streamed into the associated named log stream in real-time.

The file-oriented interface may include interface elements corresponding to any suitable file operation including file operations in accordance with a portable operating system interface standard such as the POSIX series of standards. An example set of file operations in accordance with a POSIX standard is described in "POSIX Conformance Document," Hewlett-Packard Part No. B2355-90049, June 1994. However, in at least one embodiment, log streams are substantially write-only. For example, the file-oriented interface may include an interface element corresponding to a file read operation, however, invocation of the file read operation with respect to an open log stream may result in an error code. As another example, the file-oriented interface may include an interface element corresponding to a file seek operation, however, invocation of the file seek operation with respect to an open log stream may result in an error code, or indicate success while performing no operation ("fail silently"). In at least one embodiment, the log file system does not require "formatting", for example, with a "mkfs" command.

Furthermore, some interface elements of the file-oriented interface may behave in a non-standard manner with respect to file operations (e.g., in a manner not specified by a portable operating system interface standard). In at least one embodiment, an interface element corresponding to a file open operation allows for specification of a type, class and/or labeling of log records written to a log stream with the resulting file handle. The file operation may accept a file path parameter having a portion conventionally corresponding to a sub-directory, and that portion may be utilized to type, class and/or label the log records. For example, successfully opening a log stream utilizing a file open operation with the file path parameter "/dev/logFS/myapp_error/critical" may result in a file handle that, when used for writing to the log stream "myapp_error", types, classes and/or labels written log records as "critical".

The log stream interfaces 324, 326 need not be file-oriented interfaces in each embodiment. For example, the log stream interface 324 may include interface elements corresponding to communication socket operations. An example set of communication socket operations in accordance with at least one embodiment is described in Besaw et al., "Berkely UNIX System Calls and Interprocess Communication," January 1987. As another example, the log stream interface 324 may include interface elements corresponding to a syslog interface such as syslog interfaces specified by the "syslog.h" file of POSIX-compliant computer operating systems.

The instance management portion 306 of the server 302 may include a log stream gateway 328. The log stream gateway 328 may facilitate streaming of log records written with the log stream interfaces 324, 326 of the provider instances 308, 310 to destinations within the computing cloud 202 (FIG. 2). The log stream gateway 328 may enhance log records with a suitable set of data fields including a timestamp field with values corresponding to a current date and time, and/or a provider instance field with values identifying the provider instance 324, 326 generating the log records. The log stream gateway 328 may stream log records out of the server 302 through network interface hardware dedicated to log streaming (a "log stream NIC"). The log stream gateway 328 may facilitate log stream related cloud computing protocols such as log stream related resource discovery and tracking. For example, the log stream gateway 328 may discover and track cloud computing resources allocated to the log stream processing component 214. The log stream gateway 328 may negotiate communication connections and/or sessions with log stream processing agents maintained by the log stream processing component 214, for example, responsive to log stream interface 324, 326 requests. Communication connections between the log stream gateway 328 and log stream processing agents may be encrypted. The log stream gateway 306 may participate in log stream provisioning. For example, the log stream gateway 306 may automatically mount file systems corresponding to log streams associated with the virtual computer system instances of a particular application service provider, or otherwise make available and/or implement aspects of the log stream interfaces 324, 326. Each embodiment need not include the log stream gateway 328, and the log stream interfaces 324, 326 may incorporate suitable log stream gateway functionality.

Figure 4:
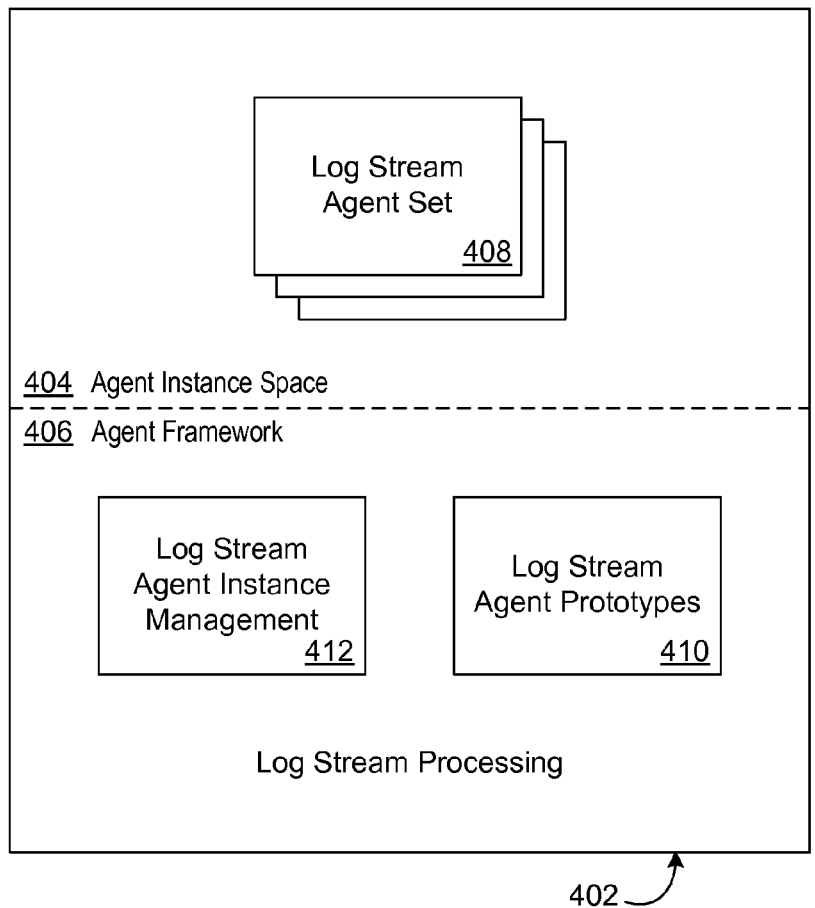
FIG. 4 is a schematic diagram depicting aspects of an example log stream processing component in accordance with at least one embodiment.

FIG. 4 depicts aspects of an example log stream processing component 402 in accordance with at least one embodiment. Resources of the computing cloud 202 (FIG. 2) may be allocated to the log stream processing component 402. The log stream processing component 402 may sub-allocate the computing cloud 202 resources to an agent instance space 404 and an agent framework portion 406. The computing cloud 202 resources allocated to the agent instance space 404 may support the operation of log stream processing agents in a log stream agent set 408. For example, there may be hundreds, thousands, millions, or more of log stream processing agent instances in the log stream agent set 408. The computing cloud 202 resources allocated to the agent instance space 404 may include a set of physical servers disjoint from the set of physical servers configured at least to maintain the provider instances 206, 208. The log stream processing agents in the log stream agent set 408 may be configured instances of log stream agent prototypes 410 maintained and/or specified by the agent framework 406. A log stream agent instance management component 412 of the agent framework 406 may create, configure and/or destroy log stream processing agent instances in the log stream agent set 408. For example, the log stream agent instance management component 412 may create and/or configure log stream processing agent instances based at least in part on the log stream agent prototypes 410.

Figure 5:
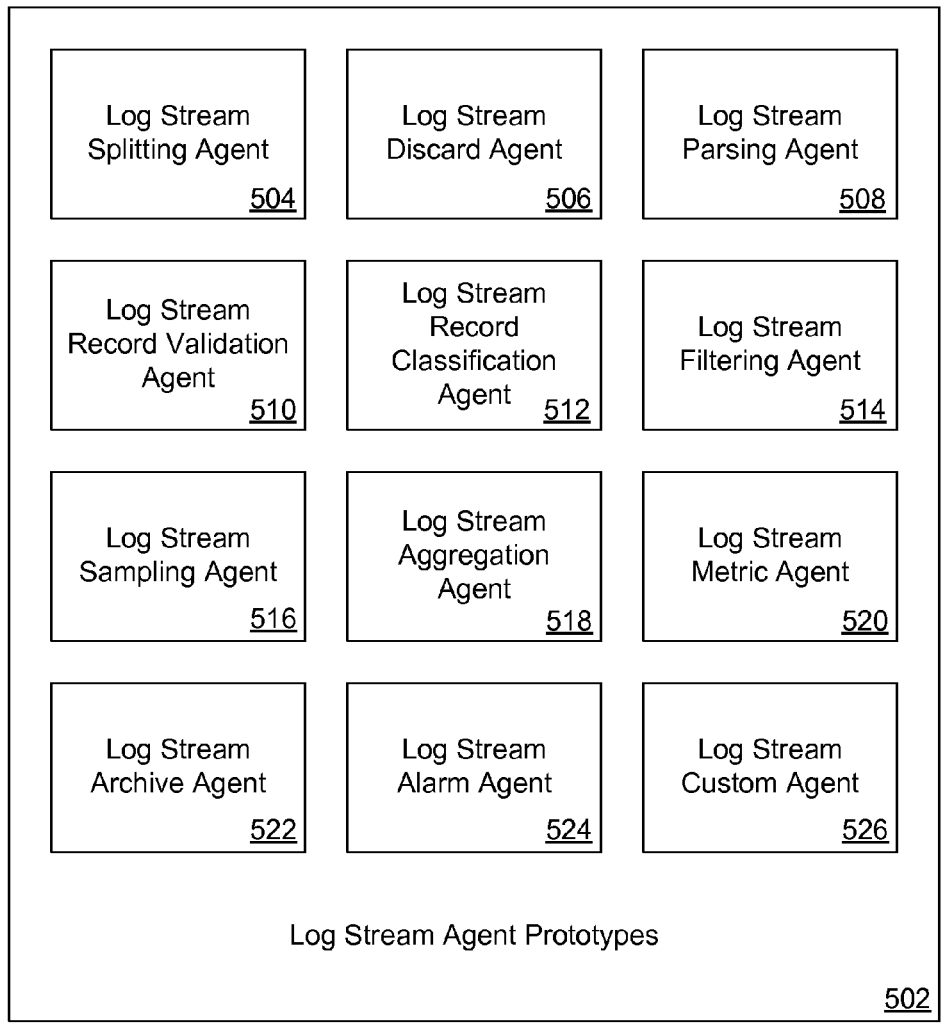
FIG. 5 is a schematic diagram depicting aspects of an example set of log stream agent prototypes in accordance with at least one embodiment.

FIG. 5 depicts aspects of an example set of log stream agent prototypes 502 in accordance with at least one embodiment. The log stream agent prototypes 502 may include any suitable log stream processing agent prototypes configurable to process log streams. For example, the set of log stream agent prototypes 502 may include a log stream splitting agent 504, a log stream discard agent 506, a log stream parsing agent 508, a log stream record validation agent 510, a log stream record classification agent 512, a log stream filtering agent 514, a log stream sampling agent 516, a log stream aggregation agent 518, a log stream metric agent 520, a log stream archive agent 522, a log stream alarm agent 524, a log stream custom agent 526, and/or suitable combinations thereof.

The log stream splitting agent 504 may be configured at least to split a log stream that is streamed to the agent 504. For example, the log stream splitting agent 504 may form a plurality of log streams that are copies of a received log stream. The log stream discard agent 506 may be configured at least to discard a log stream that is streamed to the agent 506. For example, the log stream discard agent 506 may engage in a communication protocol to receive a log stream without taking further processing action.

The log stream parsing agent 508 may be configured at least to parse a log stream received by the agent 508. For example, the log stream parsing agent 508 may identify, determine and/or parse log records in the log stream, log record metadata specifying log record formats including record delimiters, data fields within log records including fields identifying provider instances, and/or data field values. The log stream parsing agent 508 may parse the log stream in accordance with a regular expression ("regex") specified with any suitable regular expression language. Regular expressions and their associated specification languages are well known to those of skill in the art and need not be described here in detail. Alternatively, or in addition, the log stream parsing agent 508 may be configured with an output of a parser generator in accordance with a portable operating system interface (POSIX) standard such as the "yacc" parser generator well known to those of skill in the art. As a further alternative, or further in addition, the log stream parsing agent 508 may incorporate custom parsing code in accordance with a log stream parsing agent programming interface. For example, the log stream parsing agent programming interface may provide a set of parsing operations for utilization by the custom parsing code and/or limit facilities available from a conventional programmatic platform (e.g., a programmatic platform in accordance with the Ruby programming language) to a parsing related subset. Where a log stream parsing agent 508 instance is to be configured with custom parsing code, the log stream agent instance management component 412 (FIG. 4) may scan and/or test the log stream parsing agent 508 instance for malicious code and/or behavior prior to adding the log stream parsing agent 508 instance to the log stream agent set 408.

The log stream record validation agent 510 may be configured at least to validate log records in a log stream received by the agent 510 and, for example, to raise an alarm, output an error and/or make a notification if an invalid log record is detected. For example, the log stream validation agent 510 may utilize output of the log stream parsing agent 508 and compare identified log record fields with an expected set of log record fields. However, each type of log stream processing agent in the set of log stream agent prototypes 502 may have an associated cost (e.g., financial and/or with respect to allocated computing resources), and it may be that the log stream parsing agent 508 is too expensive to utilize in a validation role early in a log stream processing graph. Accordingly, the log stream record validation agent 510 may be configured to operate in a high-volume, low-cost mode with a subset of log stream parsing agent 508 functionality. For example, the log stream record validation agent 510 may be constrained to log record format validation with regular expressions.

The log stream record classification agent 512 may be configured at least to classify log records streamed to the agent 512. For example, the log stream record classification agent 512 may identify and/or determine a log record class assigned to log records with the log stream interface 324 as described above with reference to FIG. 3. Alternatively, or in addition, the log stream record classification agent 512 may utilize output of the log stream parsing agent 508 to classify log records. For example, the log stream record classification agent 512 may classify log records based at least in part on log record data fields and/or data field values. As an alternative to, or in addition to, utilizing output of the log stream parsing agent 508, the log stream record classification agent 512 may be configured to operate in a high-volume, low-cost mode with a suitable subset of log stream parsing agent 508 functionality.

The log stream filtering agent 514 may be configured at least to filter a log stream received by the agent 514. For example, the log stream filtering agent 514 may form an outgoing log stream that includes log records from the received log stream that match a log stream filter (a pass filter) and/or that do not match a log stream filter (a drop filter). The log stream filter may include one or more filtering criteria based at least in part on output of the log stream parsing agent 508, the log stream record validation agent 510, and/or the log stream record classification agent 512. Alternatively, or in addition, the log stream filter may be configured to operate in a high-volume, low-cost mode with a subset of log stream parsing agent 508 functionality, for example, utilizing pass and/or drop filters specified with regular expressions.

The log stream sampling agent 516 may be configured at least to sample a log stream received by the agent 516. For example, the log stream sampling agent 516 may form an outgoing log stream that includes a sample (e.g., a representative sample) of log records in the received log stream. The log stream sampling agent 516 can help reduce log stream processing costs in a log stream processing graph. For example, the log stream sampling agent 516 can reduce log stream volume prior to computationally expensive processing by an agent that is "downstream" in the log stream processing graph. The log stream sampling agent 516 may implement any suitable sampling technique. For example, the log stream sampling agent 516 may randomly (and/or pseudorandomly) sample log records from the incoming log stream, systematically sample log records from the incoming log stream (e.g., sample every $k^{th}$ log record), first stratify the log records by log record class (e.g., as determined by the log stream record classification agent 512), and/or suitable combinations thereof.

The log stream aggregation agent 518 may be configured at least to aggregate log records in a log stream received at the agent 518. Log records may be aggregated by log record class (e.g., as determined by the log stream record classification agent 512), generation time (e.g., a timestamp added when the log record was written to the log stream with the log stream interface 324 of FIG. 3), and/or any suitable log record attribute including log record fields and field values. For example, a sequence of n log records having a same classification within a particular time period may be aggregated as a single new aggregate log record with fields corresponding to:

[time period start]-[time period end] [log record fields] [n]

Aggregate log records may have a same set of fields as the log records they aggregate. The log stream aggregation agent 518 may be configured to aggregate the log records with respect to a specified set of fields. The field values of aggregate log records may be based at least in part on the field values of the log records they aggregate. Examples of suitable field value aggregations in accordance with at least one embodiment include concatenation and statistical summaries such as sums and averages. Alternatively, it may be required that the field values match in order for aggregation to occur. As with the log stream sampling agent 516, the log stream aggregation agent 518 can help reduce log stream processing costs, as well as costs associated with log stream storage.

The log stream metric agent 520 may be configured at least to determine a metric (and typically a time series thereof) based at least in part on a log stream received at the agent 520 and/or an output of the log stream parsing agent 508, the log stream record validation agent 510, the log stream record classification agent 512, the log stream filtering agent 514, the log stream sampling agent 516 and/or the log stream aggregation agent 518. For example, the log stream metric agent 520 may determine the metric based on data field values parsed by the log stream parsing agent 508. The log stream metric agent 520 may determine any suitable metric including linear and nonlinear functions of data field values and/or statistical summaries thereof such as sums, averages, minimums, maximums and standard deviations over suitable time periods (e.g., 1, 5, 15, 30 and/or 60 minute summary buckets). Further examples of suitable metrics include log record counts, log record rates, log record counts by log record class or type, log record rates by class or type, as well as integrals and derivatives of data field values with respect to time.

The log stream archive agent 522 may be configured at least to archive a log stream received by the agent 522. For example, the log stream archive agent 522 may store the log records in the log stream with the log stream storage component 216 (FIG. 2). Alternatively, or in addition, log stream archive agent 522 may be configured to relay the log stream to a configured provider instance such as one of the provider instances 206, 208. The log stream archive agent 522 may cooperate with the log stream storage component 216 to provide various views of the stored log records. For example, the log stream archive agent 522 may identify and/or determine the application service provider, provider instance(s) and log stream name associated with the received log stream and provide the associated information to the log stream storage component 216. The log stream storage component 216 may then make stored log records available for browsing with any suitable log record browser including suitably adapted file browsers and/or web browsers and organized by application service provider and log stream name. The log stream archive agent 522 may further identify and/or determine one or more log record classes, one or more provider instances 206, 208, and/or one or more times associated with log records in the received log stream, and provide this further associated information to the log stream storage component 216 to, at least in part, enable organization by log record class, provider instance and/or time periods of any suitable length.

The log stream alarm agent 524 may be configured at least to generate alarms based at least in part on a log stream received by the agent 524 and/or an output of the log stream parsing agent 508, the log stream record validation agent 510, the log stream record classification agent 512, the log stream filtering agent 514, the log stream sampling agent 516, the log stream aggregation agent 518 and/or the log stream metric agent 520. For example, the log stream alarm agent 524 may generate an alarm responsive to a variety of alarm generation conditions including detection of specified log record field values and/or patterns of values, detection of an invalid log record and/or a threshold number thereof, detection of a log record of a specified class and/or a threshold number thereof, a specified metric crossing a specified threshold, and/or suitable combinations thereof. Suitable such alarm generation conditions may further specify that the condition persist for at least a threshold duration before triggering alarm generation, that particular alarms be generated at a rate no greater than a specified maximum rate, and/or that such determinations be made on a per instance basis (i.e., that alarm generation conditions be determined with respect to data filtered by provider instance). The log stream alarm agent 524 may publish alarms to subscribers with a publish-subscribe mechanism of the infrastructure 212 (FIG. 2) of the computing cloud 202. For example, particular log stream alarm agent 524 instances may publish alarms to a configured topic maintained by the publish-subscribe mechanism.

The log stream custom agent 526 may incorporate custom log stream processing code in accordance with a log stream processing agent programming interface. For example, the log stream processing agent programming interface may provide a set of log stream processing operations for utilization by the custom log stream processing code including log stream processing operations corresponding to those performed by others of the log stream agent prototypes 502. Alternatively, or in addition, the log stream processing agent programming interface may modify a conventional programmatic platform (e.g., by constraining conventional functionality) to reduce a risk of and/or potential damage from malicious code. Furthermore, the log stream agent instance management component 412 (FIG. 4) may scan and/or test log stream custom agent 526 instances for malicious code and/or behavior prior to their being added to the log stream agent set 408.

Figure 6:
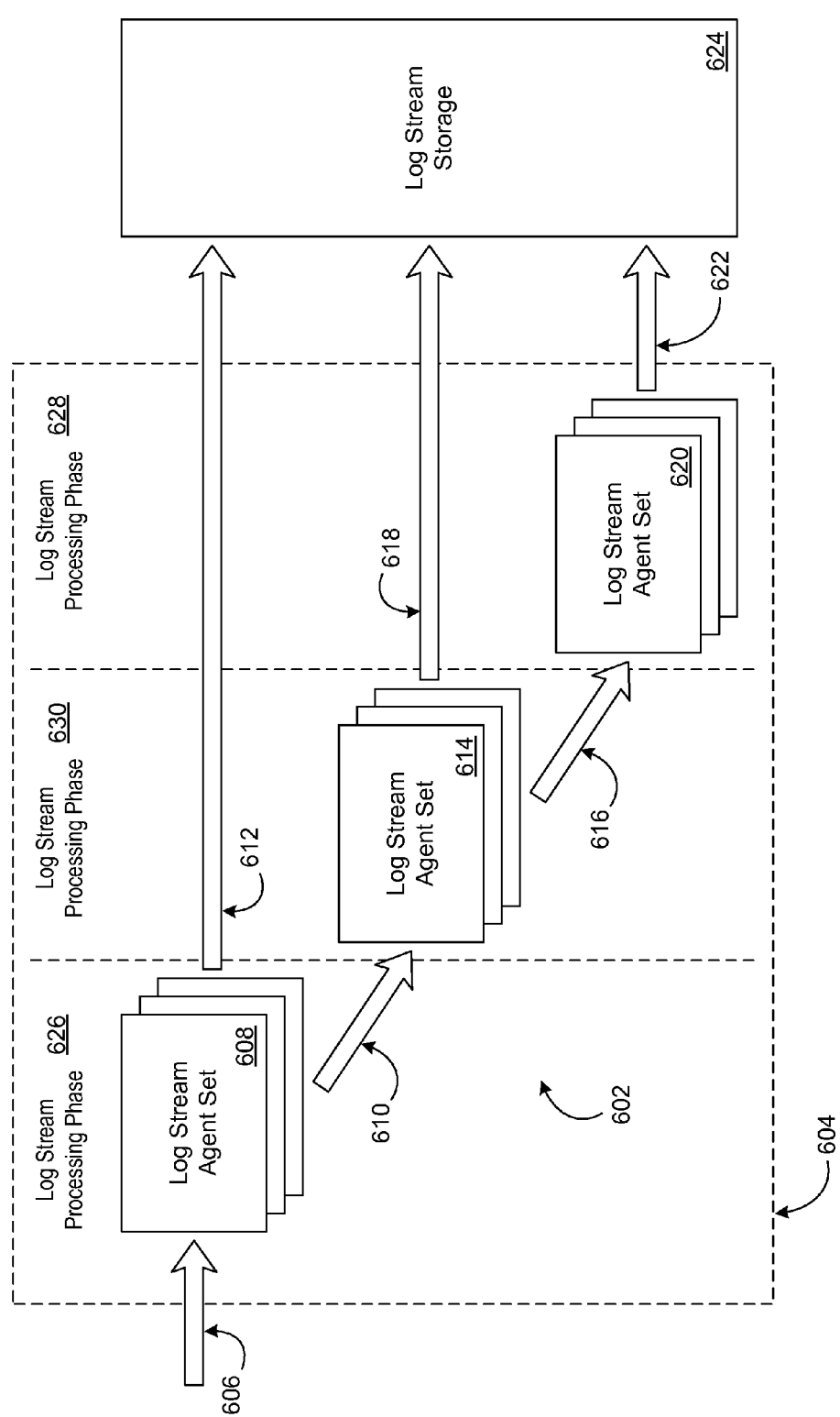
FIG. 6 is a schematic diagram depicting aspects of an example log stream processing graph in accordance with at least one embodiment.

FIG. 6 depicts aspects of an example log stream processing graph 602 in accordance with at least one embodiment. For example, the log stream processing graph 602 may be maintained in the agent instance space 404 of FIG. 4. In the example log stream processing graph 602, a log stream 606 is arrives at a first set of log stream agents 608 which generates and/or forms two outgoing log streams 610, 612. One of the outgoing log streams 610 becomes the input log stream 610 for a second set of log stream agents 614. The second set of log stream agents 614 also generates and/or forms two outgoing log streams 616, 618, one 616 of which is streamed to a third set of log stream agents 620. Each of the log stream agent sets 608, 614, 620 generates and/or forms an output log stream 612, 618, 622 that is streamed to log stream storage 624. For example, the log stream storage 624 may be provided by the log stream storage component 216 of FIG. 2. Of course, the depicted log stream processing graph 602 is just one example of the wide variety of possible log stream processing graphs in accordance with at least one embodiment.

Each of the log stream agent sets 608, 614, 620 may be arranged in a sub-graph of the log stream processing graph 602. Furthermore, each of the log stream agent sets 608, 614 and 620 may correspond to a log stream processing phase 626, 628 and 630, respectively. For example, the log stream agent set 608 of the initial log stream processing phase 626 may include agents configured for high-volume, low-cost log stream processing, the log stream agent set 620 of the final log stream processing phase 628 may include agents configured for low-volume, high-cost log stream processing, and the log stream agent set 614 of to the intermediate log stream processing phase 630 may include agents configured for intermediate-volume, intermediate-cost log stream processing. Of course, log stream processing graphs in accordance with at least one embodiment may include any suitable number and/or or type of log stream processing phases including a single such processing phase.

As an example, the initial log stream agent set 608 may include a log stream splitting agent 504 (FIG. 5) instance that routes the unprocessed log stream 606 to a log stream record validation agent 510 instance, a log stream aggregation agent 518 instance and the second log stream agent set 614. The log stream record validation agent 510 instance may enhance the log stream 606 with log record invalid flags and stream it to a log stream alarm agent 524 instance which is configured to generate an alarm if the log record invalid flag is set. The log stream aggregation agent 518 instance may be configured to aggregate log records in the incoming log stream 606, effectively compressing and/or reducing a volume of the log stream 606. The compressed log stream 612 may then be streamed to the log stream storage for later inspection.

The intermediate log stream agent set 614 may include a log stream sampling agent 516 (FIG. 5) instance configured to stratify the incoming log stream 610 by log record class and pseudorandomly sample the log records in each strata. The sampled log records may be streamed to a log stream splitting agent 504 instance, which may route the log stream to a log stream metric agent 520 instance and the third log stream agent set 620. The log stream metric agent 520 instance may apply a specified linear transformation to a specified set of data field values in a specified class of log records and, at five minute intervals, write a set of values summarizing the metric over the last five minutes (e.g., average value, standard deviation and rate of change) to the output log stream 618 for storage in the log stream storage 624. The second log stream agent set 614 is downstream from the first log stream agent set 608 and upstream from the third log stream agent set 620. The terms "downstream" and "upstream" may similarly be applied to particular log stream processing agents arranged in log stream processing graphs such as the log stream processing graph 602. The third log stream agent set 620 may include a log stream custom agent 526 (FIG. 5) instance configured to perform complex, high-cost processing on the log stream 616, and to generate the output log stream 622 as a result.

Figure 7:
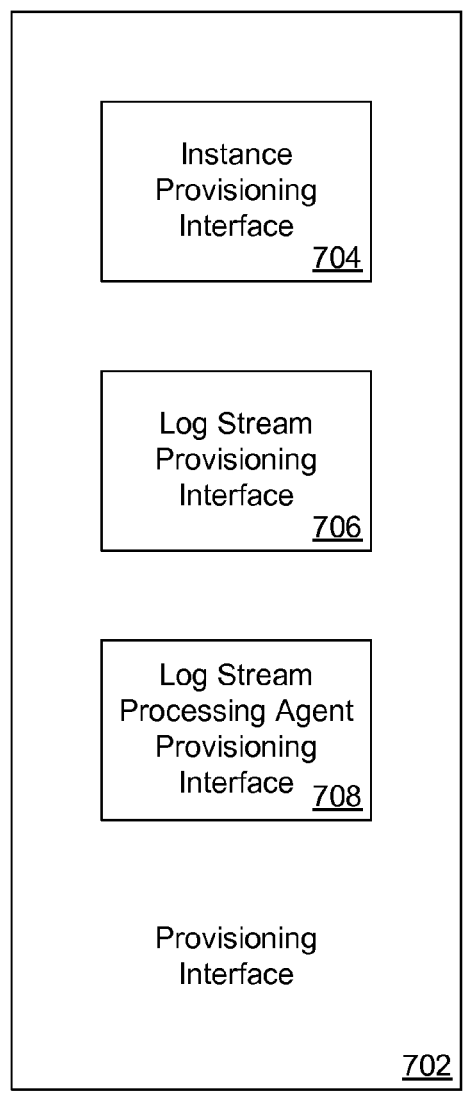
FIG. 7 is a schematic diagram depicting aspects of an example provisioning interface in accordance with at least one embodiment.

FIG. 7 depicts aspects of an example provisioning interface 702 in accordance with at least one embodiment. The provisioning interface 702 is an example of the provisioning interface 204 of FIG. 2. The provisioning interface 702 may include an instance provisioning interface 704 configured at least to facilitate provisioning of provider instances 206, 208, a log stream provisioning interface 706 configured at least to facilitate provisioning of log streams in the computing cloud 202, and a log stream processing agent provisioning interface 708 configured at least to facilitate provisioning of log stream processing agents and log stream processing graphs.

The log stream provisioning interface 706 may include any suitable set of interface elements for provisioning log streams. Such interface elements may include interface elements that facilitate creation, viewing, modification and/or deletion of log streams, as well as association of log stream end points with provisioned provider instances 206, 208 (FIG. 2), log stream processing agents 408 (FIG. 4) and/or log stream processing graphs such as the log stream processing graph 602 of FIG. 6. Interface elements that facilitate creation of log streams may accept parameters including log stream name, a log stream encryption flag indicating whether the log stream is to be encrypted, an optional encryption key and/or estimated log stream volume (e.g., log record rate). As will be appreciated by one of skill in the art, the computing cloud 202 may maintain a set of encryption keys for enhancing the privacy of intra-cloud communications. Costs associated with log streams may be obtained through the log stream provisioning interface 706. In accordance with at least one embodiment, a cost may be determined for any suitable attribute of a log stream including computing resource utilization.

The log stream processing agent provisioning interface 708 may include any suitable set of interface elements for provisioning log stream processing agents 408 (FIG. 4) and/or log stream processing graphs such as the log stream processing graph 602 of FIG. 6. Such interface elements may include interface elements that facilitate instantiation, configuration, inspection, modification and/or deletion of log stream processing agent 408 instances, as well as creation, viewing, modification and/or deletion of log stream processing graphs including designation of log stream processing graph root nodes. Log stream processing agents 408 may be instantiated based at least in part on log stream agent prototypes 502 (FIG. 5), as well as suitable log stream agent prototype configuration parameters. Costs associated with log stream processing agents and/or log stream processing graphs may be obtained through the log stream processing agent provisioning interface 708. In accordance with at least one embodiment, a cost may be determined for any suitable attribute of a log stream processing agent and/or log stream processing graph including computing resource utilization.

Figure 8:
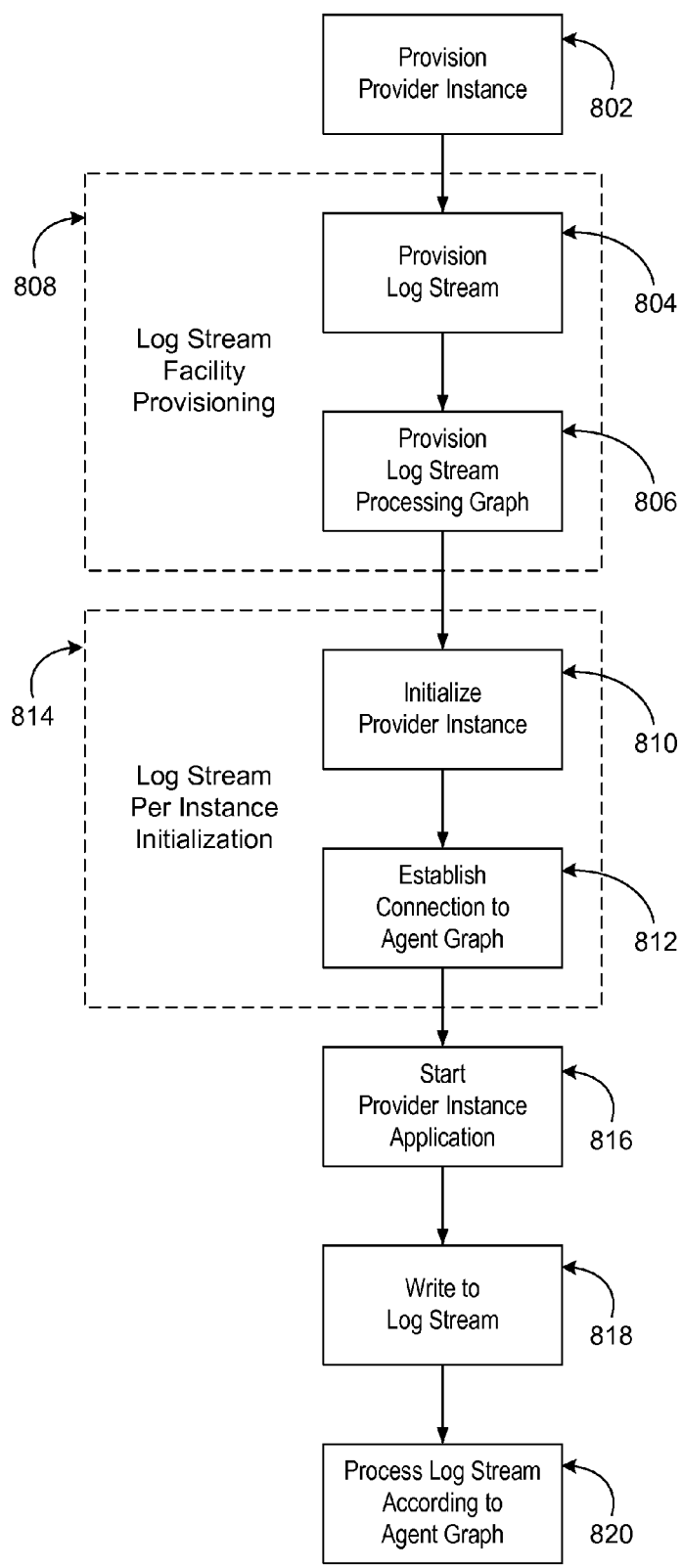
FIG. 8 is a flowchart depicting example steps for log streaming in accordance with at least one embodiment.

FIG. 8 depicts example steps for log streaming in accordance with at least one embodiment. At step 802, a provider instance may be provisioned. For example, the application service provider may provision the provider instance 206 (FIG. 2) with the provisioning interface 204. At step 804, a log stream may be provisioned. For example, the application service provider may provision the log stream with the provisioning interface 204. At step 806, a log stream processing graph may be provisioned. For example, the application service provider may provision the log stream processing graph 602 (FIG. 2) and associated log stream processing agents with the provisioning interface 204 including associating the log stream processing graph 602 with the log stream provisioned at step 804. In at least one embodiment, steps 804 and 806 are part of a log stream facility provisioning process 808 in which multiple log streams and/or log stream processing graphs may be provisioned.

Provider instances, being virtual computer systems, may require an initialization step. At step 810, the provider instance may be initialized. For example, the provider instance 206 (FIG. 2) may be initialized by the application service provider with the provisioning interface 204. The provider instance may initialize automatically subsequent to provisioning As part of provider instance initialization, or as depicted in FIG. 8, subsequent to provider instance initialization, at step 812, a connection to the log stream processing graph may be established. For example, the log stream gateway 328 (FIG. 3) may negotiate and/or establish a communication connection with a root agent of the log stream processing graph 602 (FIG. 6). The communication connection may be established independent of a user of the log stream interface 324. In at least one embodiment, steps 810 and 812 are part of a log stream per instance initialization process 814 in which multiple provider instances may be initialized.

At step 816, an application at the provider instance may be started. For example, the administrator of the provider instance 308 (FIG. 3) may start the application 320. At step 818, one or more log records may be written to the log stream. For example, the application 320 may write one or more log records to the log stream provisioned at step 804. The application 320 may write the log record(s) to the log stream with the log stream interface 324. At step 820, the log stream may be processed in real-time or substantially-real time in accordance with the log stream processing graph. For example, the log record(s) written to the log stream by the application 320 may be streamed to a root log stream processing agent of the log stream processing graph provisioned at step 806. The log record(s) may then be processed in real-time or substantially-real time by log stream processing agents corresponding to nodes in the log stream processing graph in an order corresponding to the order of nodes in the log stream processing graph.

The log stream processing of step 820 may change dynamically in response (may be "dynamically responsive") to reconfigurations of at least the log stream 606, the log stream processing agents (e.g., the log stream agent sets 608, 614, 620 of FIG. 6), and/or the log stream processing graph 602. For example, the log stream 606 may be streamed to another log stream processing graph (as an alternative, or in addition to the log stream processing graph 602), multiple log streams may be directed to the root of the log stream processing graph 602, the composition of the log stream agent sets 608, 614, 620 may change, and/or the log stream processing graph 602 may be dynamically reconfigured to immediately change how the log stream 606 is processed.

Figure 9:
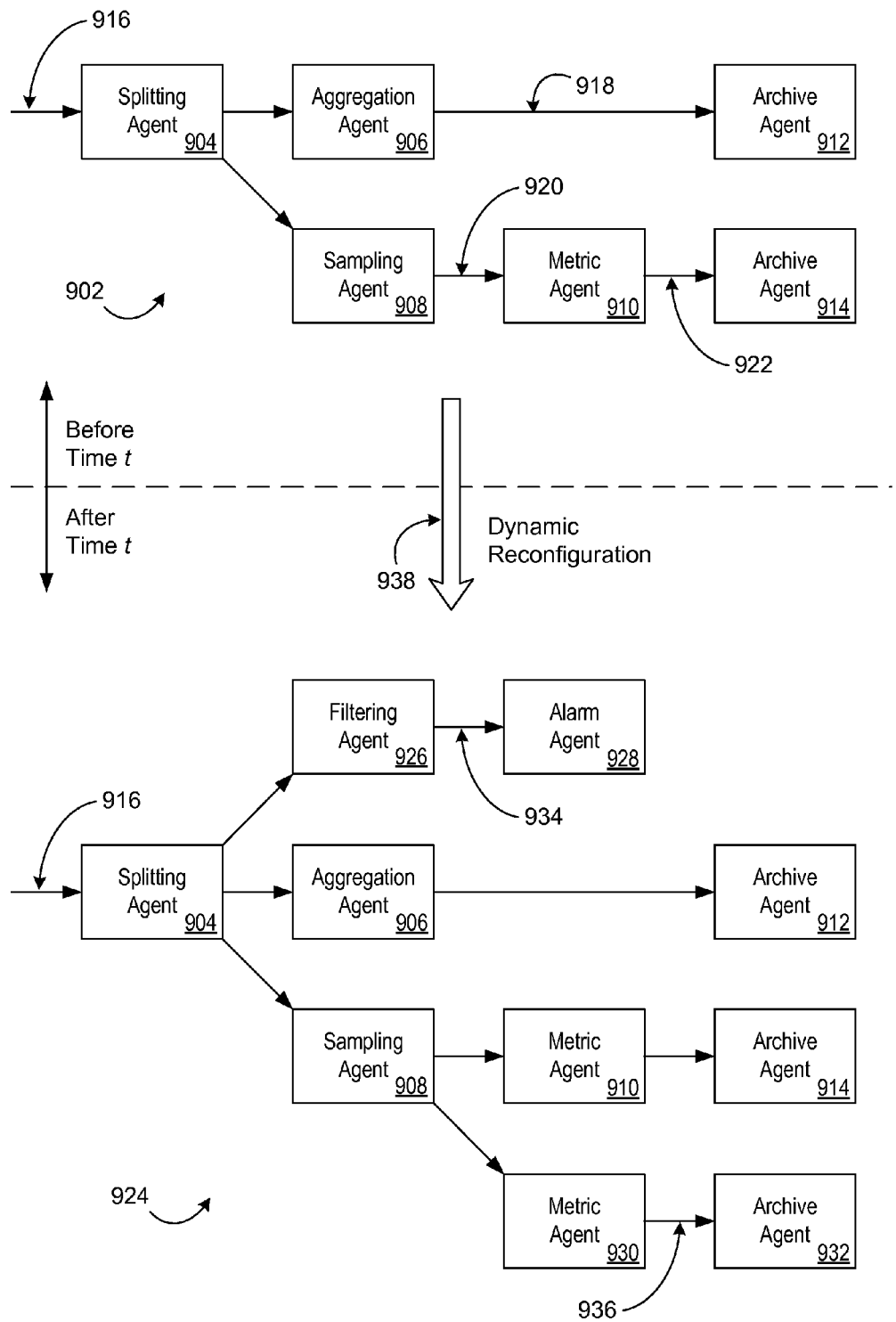
FIG. 9 is a schematic diagram depicting aspects of an example dynamic reconfiguration of a log stream processing graph in accordance with at least one embodiment.

FIG. 9 depicts aspects of an example dynamic reconfiguration of a log stream processing graph 902 in accordance with at least one embodiment. During a first time period, ending at time t, the log stream processing graph 902 arranges a log stream splitting agent 904 instance, a log stream aggregation agent 906 instance, a log stream sampling agent 908 instance, a log stream metric agent 910 instance, and two log stream archive agent instances 912, 914, as depicted in FIG. 9. A log stream 916 is split by the splitting agent 904 into two copies, one streamed to the aggregation agent 906, and one streamed to the sampling agent 908. The aggregation agent 906 forms an aggregated log stream 918, which is streamed to the archive agent 912 for archiving. The sampling agent 908 forms a sampled log stream 920, which is streamed to the metric agent 910. The metric agent 910 derives a metric from the sampled log stream 920, and streams a time series of the metric 922 to the archive agent 914 for archiving.

The log stream processing graph 902 may have been initially provisioned by the application service provider utilizing the provisioning interface 204 (FIG. 2), and may have been faithfully processing the log stream 916 throughout the first time period. At the end of the first time period, the application service provider may dynamically reconfigure 938 the log stream processing graph 902, again utilizing the provisioning interface 204, to create the log stream processing graph 924. During a second time period, beginning at time t, the log stream processing graph 924 may process the log stream 916 according to the new configuration.

The example depicted in FIG. 9 shows the log stream processing graph 924 including each of the agent instances 904-914 of the initially provisioned log stream processing graph 902. Of course, this need not be the case. Such reconfiguration may include any suitable combination of agent instance addition, deletion and reconfiguration. The log stream processing graph 924 further includes a log stream filtering agent 926 instance, a log stream alarm agent 928 instance, another log stream metric agent instance 930, and another log stream archive agent instance 932. In the reconfigured log stream processing graph 924, the splitting agent 904 streams a further copy of the log stream 916 to the filtering agent 926. The filtering agent 926 filters the log stream 916 copy to form a filtered log stream 934, and streams the filtered log stream 934 to the alarm agent 928. The alarm agent 928 monitors the filtered log stream 934 for alarm conditions and generates alarms when the alarm conditions are met. In addition, in the reconfigured log stream processing graph 924, the sampling agent 908 has been reconfigured to stream a copy of the sampled log stream 920 to the new metric agent instance 930. The metric agent 930 derives another metric from the sampled log stream, and streams a time series of the new metric 936 to the new archive agent 932 for archiving and later inspection.

Figure 10:
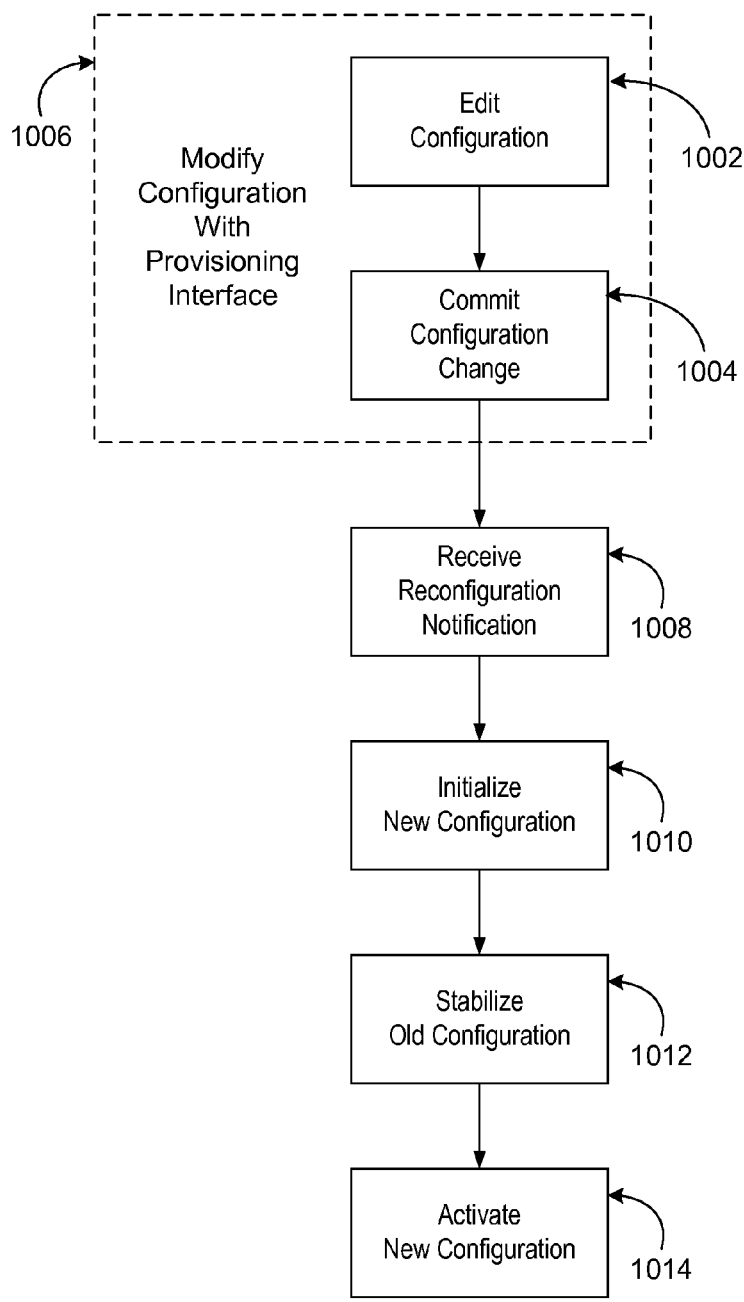
FIG. 10 is a flowchart depicting example steps for dynamic reconfiguration of log streams, log stream processing agents and/or log stream processing graphs in accordance with at least one embodiment.

From the point of view of the application service provider, the dynamic reconfiguration 938 of the log stream processing graph 902 may occur immediately. However, there may a transition period, for example, to allow the old log stream processing graph 902 to reach a stable transition state. FIG. 10 depicts example steps for dynamic reconfiguration of log streams, log stream processing agents and/or log stream processing graphs in accordance with at least one embodiment. At step 1002, a configuration may be edited. For example, the application service provider may edit a configuration of a log stream, a log stream processing agent (e.g., the log stream processing agent instance 908 of FIG. 9), and/or a log stream processing graph (e.g., the log stream processing graph 902) with the provisioning interface 204 (FIG. 2). At step 1004, changes to the configuration made at step 1002 may be committed. For example, the provisioning interface 204 may include a facility to commit a set of configuration changes atomically and/or as a whole. Steps 1002 and 1004 are shown included in a dashed box 1006 to indicate that these steps 1002, 1004 may be performed by and/or through the provisioning interface 204. Following steps may be performed by other appropriate components in the infrastructure portion 212 of the computing cloud 202.

At step 1008, a reconfiguration notification may be received. For example, the log stream processing component 214 (FIG. 2) may receive notification that the log stream processing graph 902 (FIG. 9) is to be reconfigured. At step 1010, a new configuration may be initialized. For example, the log stream processing component 214 may initialize the new log stream processing graph 924. At step 1012, the old configuration may be stabilized. For example, the log stream processing component 214 may buffer the log stream 916 until the old log stream processing graph 902 is empty. At step 1014, the new configuration may be activated. For example, the log stream processing component 214 may allow the log stream 916 to flow through the new log stream processing graph 924. As will be apparent to one of skill in the art, the steps of FIG. 10 may be applied to individual log stream processing agents, as well as log streams.

Figure 11:
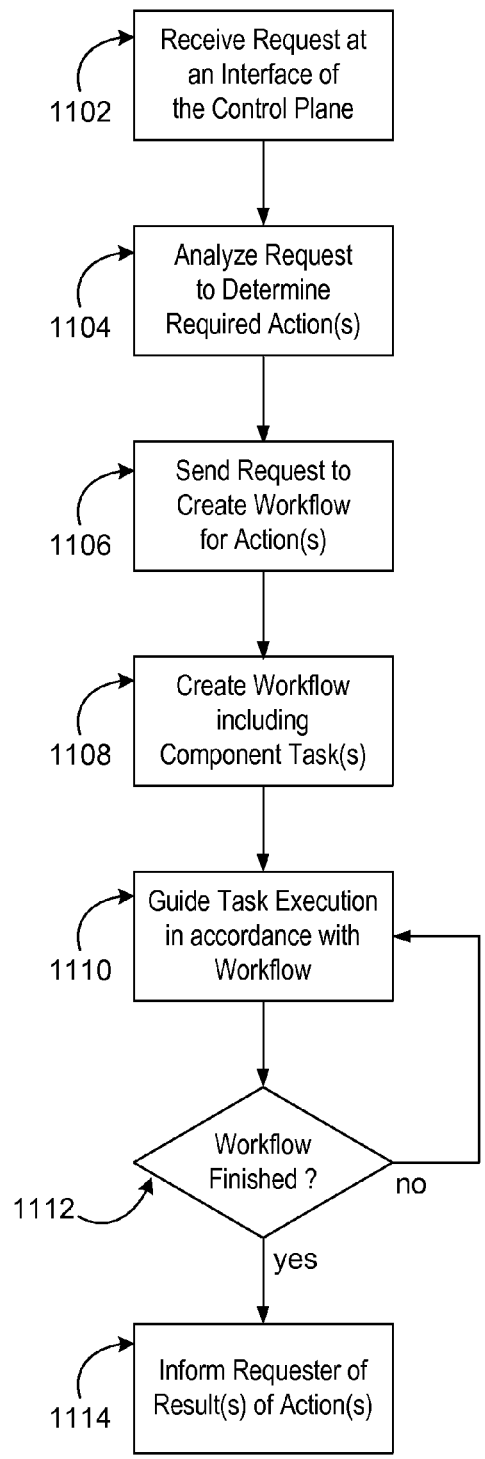
FIG. 11 is a flowchart depicting example steps for a control plane in accordance with at least one embodiment.

FIG. 11 depicts example steps for a control plane in accordance with at least one embodiment. At step 1102, a request may be received by an interface of the control plane.

For example, the provisioning interface 204 (FIG. 2) of the control plane 226 may receive the request from the provider administration client 224. The request may be a call to a programmatic interface such as an application programming interface (API) or a Web services interface, e.g., utilizing a Simple Object Access Protocol (SOAP) call. Alternatively, or in addition, the request may be received through a Web-based GUI. At step 1104, the request may be analyzed to determine one or more actions required to successfully complete the request. For example, the provisioning interface 204 may analyze the request, and determine a set of actions required to provision a log stream. In an embodiment where the interface receiving the request corresponds to a specific action to be performed, the interface may extract information from the request to be utilized in determining aspects and/or parameters of the action to be performed.

At step 1106, a request may be sent to create a workflow based at least in part on the one or more actions determined at step 1104. For example, the provisioning interface 204 (FIG. 2) may send the request to the workflow component 228. The request to create the workflow may include the action(s), action metadata such as type of action, and/or action parameters. In at least one embodiment, the control plane 226 and/or the workflow component 228 maintains a job queue for such requests, and workflows are created responsive to new additions to the job queue. At step 1108, a workflow and one or more component tasks may be created. For example, the workflow component 228 may analyze the request of step 1106 to determine the appropriate workflow and component tasks to create.

At step 1110, execution of the component task(s) may be guided in accordance with the workflow. For example, the workflow component 228 may activate elements of interfaces of components of the application space portion 210 (FIG. 2) and/or the infrastructure portion 212 of the computing cloud 202. Alternatively, or in addition, the workflow component 228 may manage bids for execution of the component task(s) by components of the computing cloud 202. At step 1112, it may be determined whether the workflow has finished. For example, the workflow component may determine whether a final task in a sequence of tasks managed by the workflow has completed. If so, a procedure including step 1112 may progress to step 1114. Otherwise the procedure may return to step 1110 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 1114, the sender of the request of step 1102 may be informed of the result(s) of the action(s).

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for facilitating log stream processing in a distributed program execution service, comprising:
   under control of one or more computer systems configured with executable instructions,
      provisioning at least one virtual computer system instance in the distributed program execution service;
      provisioning at least one log stream in the distributed program execution service, access to the log stream made available to said at least one virtual computer system instance through a file-oriented interface;
      provisioning, in the distributed program execution service, a set of log stream processing agents arranged according to a log stream processing graph as determined at least in part by at least one interaction with a provisioning interface of the distributed program execution service, a plurality of the set of log stream processing agents being associated with at least one input log stream and at least one output log stream and the log stream processing graph determining when an output log stream of a first log stream processing agent of the set of log stream processing agents is an input log stream of a second log stream processing agent of the set of log stream processing agents;
      receiving a plurality of log records into the log stream through the file-oriented interface and streaming the plurality of log records in the log stream to at least one of the set of log stream processing agents;
      processing the log stream in real-time with the set of log stream processing agents in accordance with the log stream processing graph, the processing responsive to reconfigurations of at least the log stream, the set of log stream processing agents, and the log stream processing graph as determined at least in part by at least one interaction with the provisioning interface of the distributed program execution service; and
      storing an output of at least one of the set of log stream processing agents for inspection.

2. A computer-implemented method according to claim 1, wherein the provisioning interface of the distributed program execution service comprises at least one Web-based provisioning interface.

3. A computer-implemented method according to claim 1, wherein the provisioning interface of the distributed program execution service establishes at least one workflow to guide the determining in response to said at least one interaction.

4. A computer-implemented method for facilitating log stream processing in a distributed program execution service, comprising:
   under control of one or more computer systems configured with executable instructions,
      provisioning, in an infrastructure portion of the distributed program execution service, at least one log stream and a set of log stream processing agents arranged according to a log stream processing graph as determined at least in part by at least one interaction with a provisioning interface of the distributed program execution service, a plurality of the set of log stream processing agents being associated with at least one input log stream and at least one output log stream and the log stream processing graph determining when an output log stream of a first log stream processing agent of the set of log stream processing agents is an input log stream of a second log stream processing agent of the set of log stream processing agents;
      mounting a file system to a mount point of a virtual system instance in an application provider portion of the distributed program execution service, the file system providing a file-oriented interface to said at least one log stream;
      receiving at least one log record into said at least one log stream through the file-oriented interface and streaming said at least one log record in said at least one log stream to at least one of the set of log stream processing agents in the infrastructure portion of the distributed program execution service;
      processing said at least one log stream in real-time with at least said at least one of the set of log stream processing agents, the processing responsive to a reconfiguration of at least said at least one log stream or the set of log stream processing agents determined based at least in part upon at least one interaction with the provisioning interface of the distributed program execution service; and storing an output of at least one of the set of log stream processing agents for inspection.

5. A computer-implemented method according to claim 4, wherein the file-oriented interface comprises:
a file open interface element accepting a file path parameter and providing a file handle upon successful access of the log stream;
a file write interface element accepting the file handle and at least a reference to one or more log records to be written to the log stream; and
a file close interface element accepting the file handle.

6. A computer-implemented method according to claim 5, wherein:
the method further comprises provisioning the log stream in the distributed program execution service including naming the log stream; and
the file path parameter includes the provisioned name of the log stream.

7. A computer-implemented method according to claim 4, wherein the file-oriented interface is configured to operate in a write-only mode in which activation of an element of the file-oriented interface that corresponds to read functionality is ineffective.

8. A computer-implemented method according to claim 4, wherein each of a plurality of virtual system instances in the application provider portion of the distributed program execution service mount the file system providing the file-oriented interface to said at least one log stream.

9. A computer-implemented method according to claim 8, wherein the stored output of said at least one of the set of log stream processing agents comprises a plurality of processed log records each explicitly associated with its source virtual system instance.

10. A computer-implemented method for facilitating log stream processing in a distributed program execution service, comprising:
under control of one or more computer systems configured with executable instructions,
provisioning at least one log stream in the distributed program execution service thereby making said at least one log stream available to a plurality of virtual system instances in an application provider portion of the distributed program execution service;
provisioning, in an infrastructure portion of the distributed program execution service, a set of log stream processing agents arranged according to a log stream processing graph as determined at least in part by at least one interaction with a provisioning interface of the distributed program execution service, a plurality of the set of log stream processing agents being associated with at least one input log stream and at least one output log stream and the log stream processing graph determining when an output log stream of a first log stream processing agent of the set of log stream processing agents is an input log stream of a second log stream processing agent of the set of log stream processing agents;
receiving, from at least one of the plurality of virtual system instances, at least one log record into said at least one log stream and streaming said at least one log record in said at least one log stream to the log stream processing graph;

processing said at least one log stream in real-time with the set of log stream processing agents in accordance with the log stream processing graph, the processing responsive to a reconfiguration of at least said at least one log stream, the set of log stream processing agents, or the log stream processing graph determined at least in part by at least one interaction with the provisioning interface of the distributed program execution service; and storing an output of at least one of the set of log stream processing agents for inspection.

11. A computer-implemented method according to claim 10, wherein streaming said at least one log record in said at least one log stream to the log stream processing graph comprises streaming said at least one log record in said at least one log stream to a root log stream processing agent of the log stream processing graph.

12. A computer-implemented method according to claim 10, wherein:
the log stream processing graph comprises an upstream log stream processing agent linked to at least one downstream log stream processing agent; and
processing said at least one log stream in real-time with the set of log stream processing agents in accordance with the log stream processing graph comprises streaming an output of the upstream log stream processing agent in real-time to said at least one downstream log stream processing agent.

13. A computer-implemented method according to claim 10, wherein the set of log stream processing agents comprises a log stream parsing agent configured at least to parse at least one field value from said at least one log record.

14. A computer-implemented method according to claim 13, wherein provisioning the log stream parsing agent comprises configuring the log stream parsing agent in accordance with an output of a parser generator.

15. A computer-implemented method according to claim 13, wherein provisioning the log stream parsing agent comprises configuring the log stream parsing agent with custom parsing code in accordance with a log stream parsing agent programming interface.

16. A computer-implemented method according to claim 15, wherein provisioning the log stream parsing agent comprises testing the custom parsing code for malicious behavior.

17. A computer-implemented method according to claim 10, wherein the set of log stream processing agents comprises a log stream aggregation agent configured at least to aggregate a plurality of log records of a same type such that an output log stream of the log stream aggregation agent has fewer log records than an input log stream of the log stream aggregation agent, the log stream aggregation agent substituting one aggregate log record in place of the plurality of log records of the same type, the aggregate log record having fields corresponding to the fields of the plurality of log records of the same type and at least one additional field corresponding to a time period associated with the plurality of log records of the same type.

18. A computer-implemented method according to claim 10, wherein the set of log stream processing agents comprises a log stream sampling agent configured at least to form an output log stream that includes a representative and random sample of log records streamed to the log stream sampling agent such that the output log stream of the log stream sampling agent has fewer log records than an input log stream of the log stream sampling agent.

19. A computer-implemented method according to claim 10, wherein the set of log stream processing agents comprises a log stream filtering agent configured at least to form an output log stream that includes only those log records streamed to the log stream filtering agent that match a log record filter such that the output log stream of the log stream filtering agent has fewer log records than an input log stream of the log stream filtering agent, the log record filter including a filtering criteria based at least in part on at least one output from at least one other log stream processing agent in the set of log stream processing agents.

20. A computer-implemented method according to claim 10, wherein the set of log stream processing agents comprises a log stream metric agent configured at least to determine a metric based at least in part on values in at least one field of log records streamed to the log stream metric agent.

21. A computer-implemented method according to claim 10, wherein the set of log stream processing agents comprises a log stream alarm agent configured at least to generate an alarm based at least in part on values in at least one field of log records streamed to the log stream alarm agent.

22. A computerized system for facilitating log stream processing in a distributed program execution service, comprising:
  a first set of servers collectively hosting a set of virtual system instances in an application provider portion of the distributed program execution service; and
  a second set of servers collectively hosting, in an infrastructure portion of the distributed program execution service, a set of log stream processing agents arranged according to a log stream processing graph provisioned based at least in part upon at least one interaction with a provisioning interface of the distributed program execution service, a plurality of the set of log stream processing agents being associated with at least one input log stream and at least one output log stream and the log stream processing graph determining when an output log stream of a first log stream processing agent of the set of log stream processing agents is an input log stream of a second log stream processing agent of the set of log stream processing agents, the second set of servers collectively configured to, at least:
    receive, from at least one of the set of virtual system instances, at least one log record streamed in at least one log stream to the log stream processing graph;
    process said at least one log stream with the set of log stream processing agents in accordance with the log stream processing graph, the processing responsive to a reconfiguration of at least said at least one log stream, the set of log stream processing agents, or the log stream processing graph determined based at least in part upon at least one interaction with the provisioning interface of the distributed program execution service; and
    store an output of at least one of the set of log stream processing agents for inspection.

23. A computerized system according to claim 22, wherein the first set of servers and the second set of servers are disjoint.

24. One or more non-transitory computer-readable media having collectively thereon computer-executable instructions that configure one or more computers to collectively, at least:
  provision, in an infrastructure portion of a distributed program execution service, at least one log stream and a set of log stream processing agents arranged according to a log stream processing graph as determined at least in part by at least one interaction with a provisioning interface of the distributed program execution service, a plurality of the set of log stream processing agents being associated with at least one input log stream and at least one output log stream and the log stream processing graph determining when an output log stream of a first log stream processing agent of the set of log stream processing agents is an input log stream of a second log stream processing agent of the set of log stream processing agents;
  make available, to a virtual system instance in an application provider portion of the distributed program execution service, a file-oriented interface to said at least one log stream;
  receive at least one log record into said at least one log stream through the file-oriented interface and stream said at least one log record in said at least one log stream to at least one of the set of log stream processing agents in the infrastructure portion of the distributed program execution service;
  process said at least one log stream in real-time with at least said at least one of the set of log stream processing agents, the processing responsive to a reconfiguration of at least said at least one log stream or the set of log stream processing agents determined based at least in part upon at least one interaction with the provisioning interface of the distributed program execution service; and
  store an output of at least one of the set of log stream processing agents for inspection.

25. One or more non-transitory computer-readable media according to claim 24, wherein said at least one log record is streamed from a log stream gateway at a server hosting a plurality of virtual system instances in the application provider portion of the distributed program execution service including the virtual system instance to which the file-oriented interface is made available.

26. A computer-implemented method according to claim 1, wherein said at least one log stream is provisioned in the distributed program execution service independent of said at least one virtual computer system instance and the plurality of log records.

27. A computer-implemented method according to claim 1, wherein provisioning said at least one log stream comprises specifying the log stream processing graph with the provisioning interface.

* * * * *